June 28, 1932.　　　　S. E. BUETTELL　　　　1,864,711
VEHICLE STORAGE SYSTEM
Filed May 11, 1928　　　12 Sheets-Sheet 2

June 28, 1932.   S. E. BUETTELL   1,864,711
VEHICLE STORAGE SYSTEM
Filed May 11, 1928   12 Sheets-Sheet 3

Inventor:
Samuel E. Buettell
By John E. Gardner
Atty

June 28, 1932.  S. E. BUETTELL  1,864,711
VEHICLE STORAGE SYSTEM
Filed May 11, 1928    12 Sheets-Sheet 4

Witness:
William P. Kilroy

Inventor:
Samuel E. Buettell
John E. Gardner
By
Atty

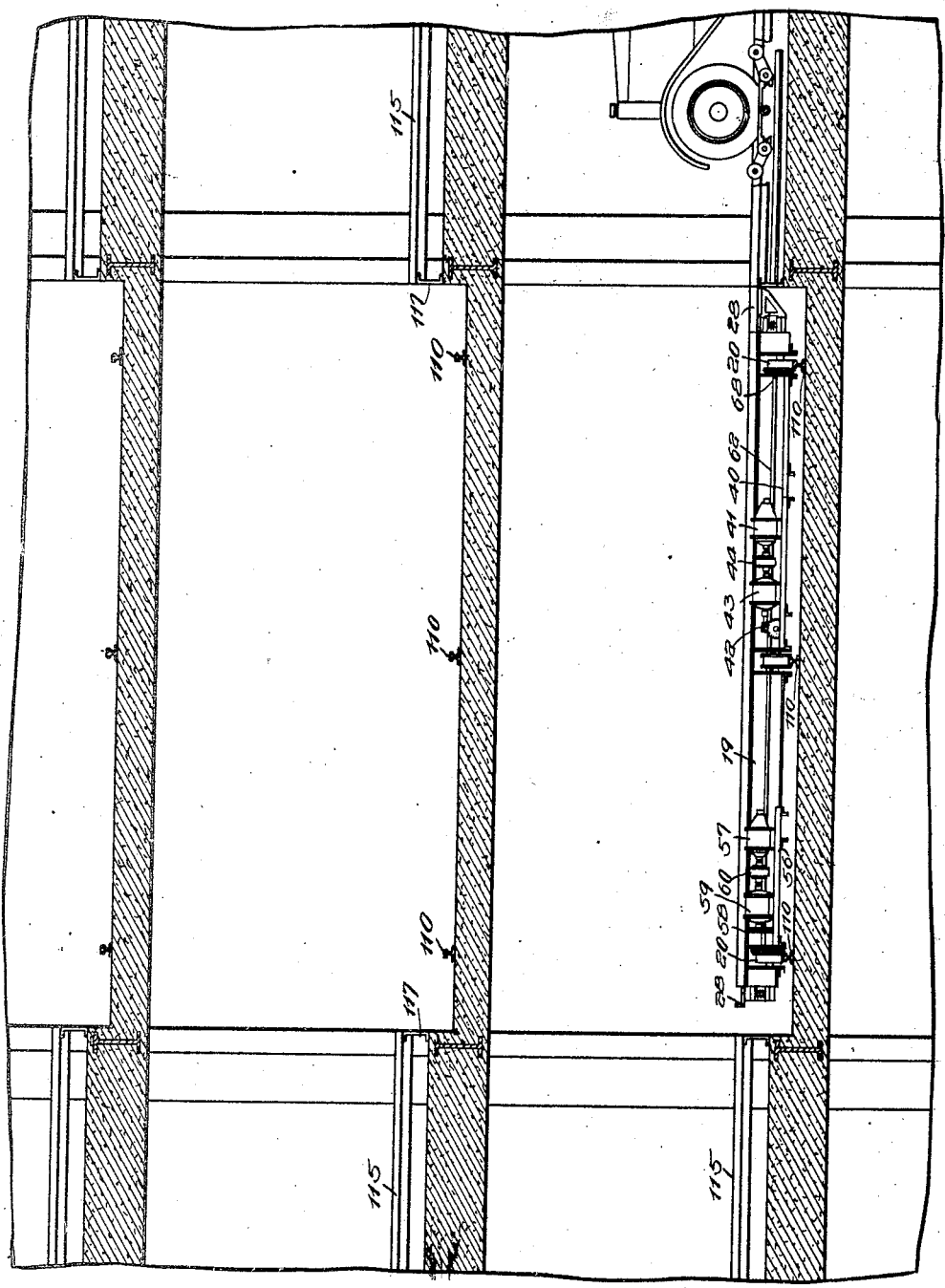

June 28, 1932.    S. E. BUETTELL    1,864,711
VEHICLE STORAGE SYSTEM
Filed May 11, 1928    12 Sheets-Sheet 6
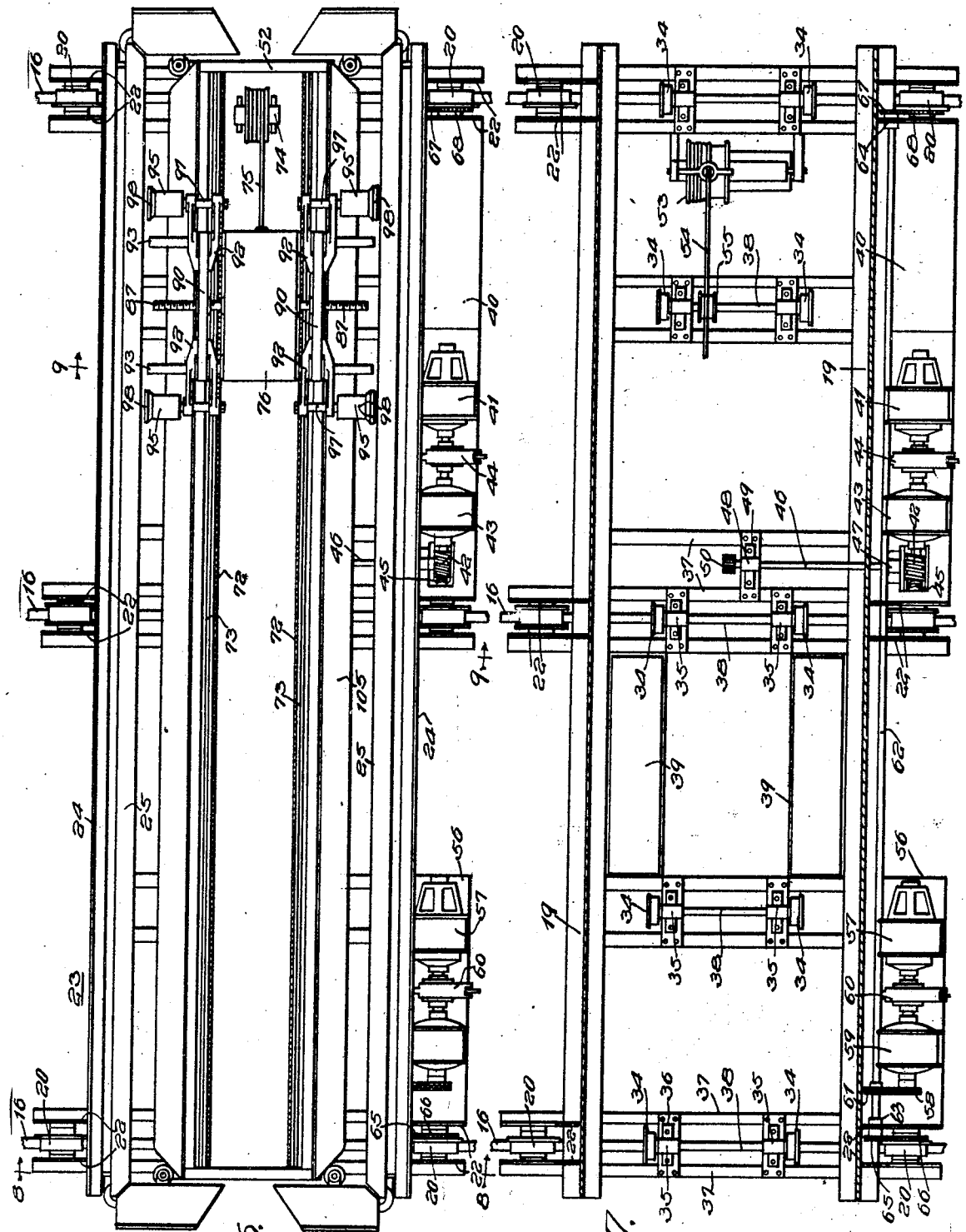
Inventor:
Samuel E. Buettell
By John E. Gardner
Atty

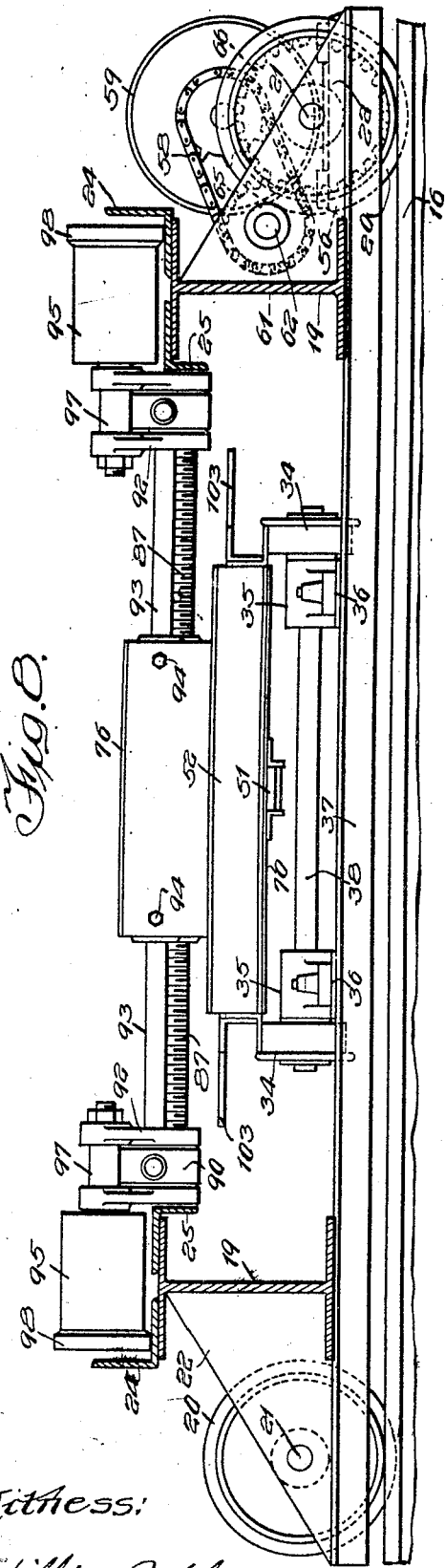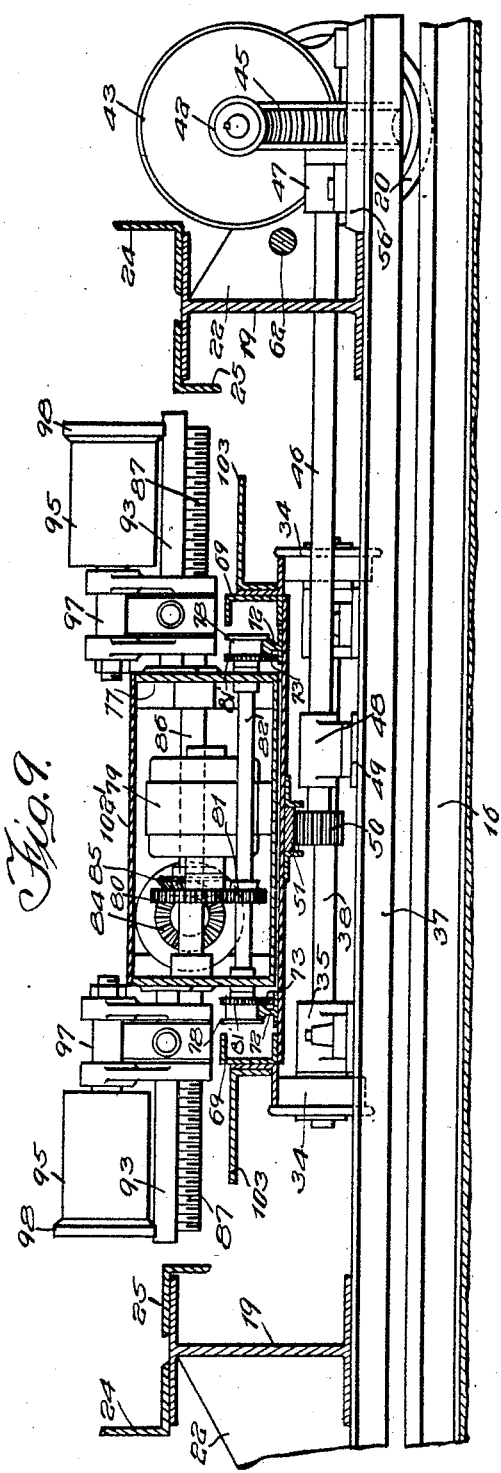

June 28, 1932.  S. E. BUETTELL  1,864,711
VEHICLE STORAGE SYSTEM
Filed May 11, 1928   12 Sheets-Sheet 8
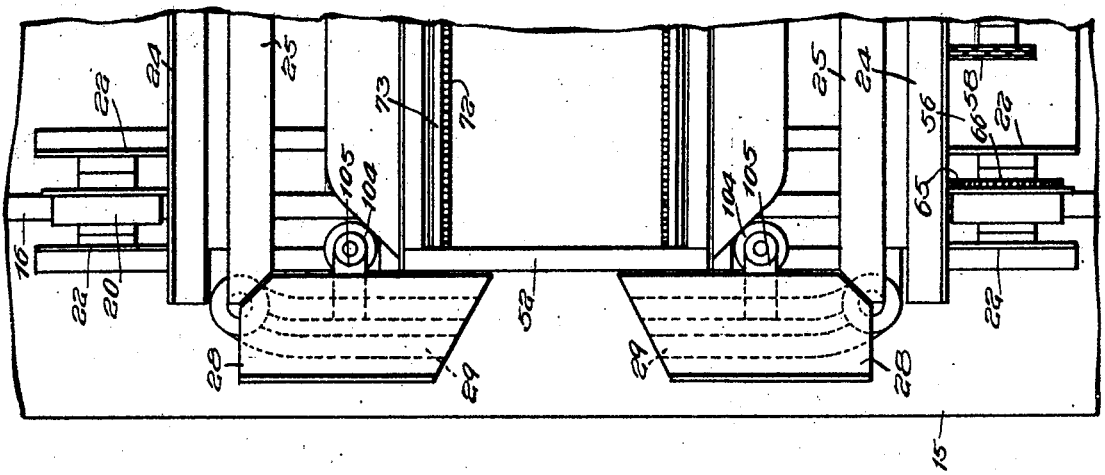
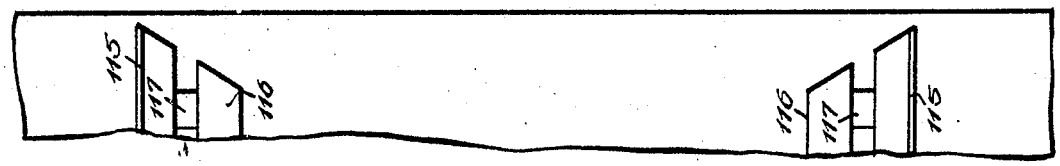
Fig. 11.
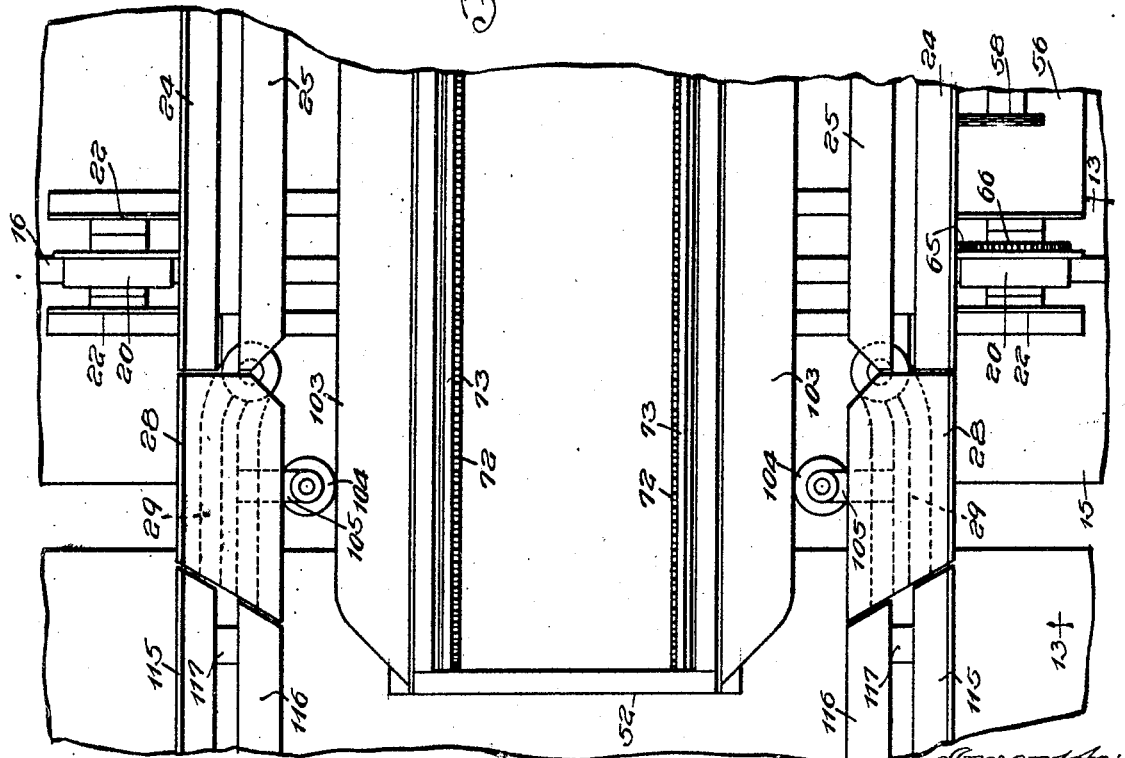
Fig. 10.
Witness:
William P. Kilroy
Inventor:
Samuel E. Buettell
By John E. Gardner
Atty.

June 28, 1932.  S. E. BUETTELL  1,864,711
VEHICLE STORAGE SYSTEM
Filed May 11, 1928    12 Sheets-Sheet 9
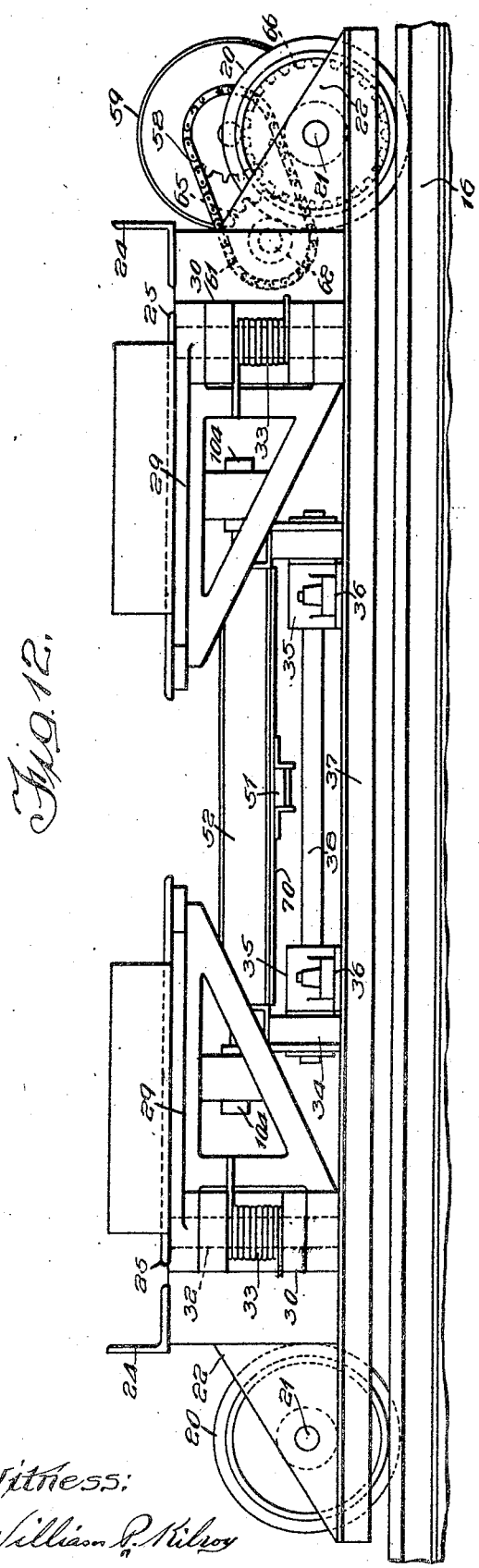
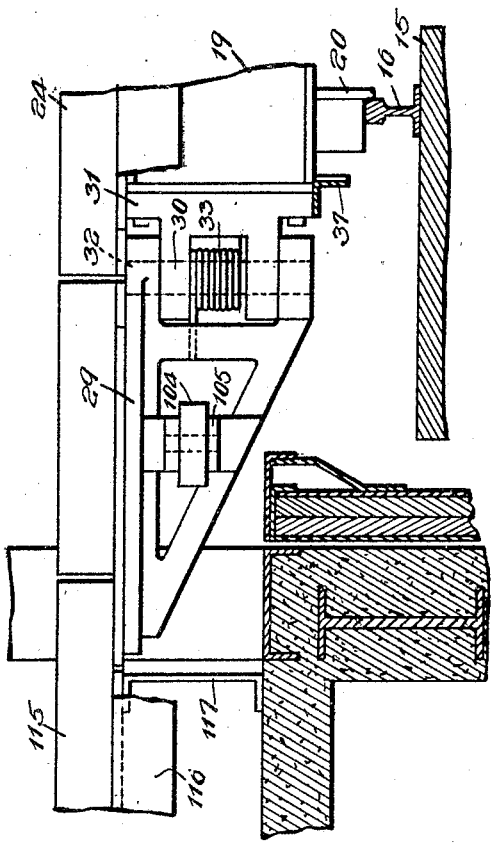
Inventor:
Samuel E. Buettell June 28, 1932. S. E. BUETTELL 1,864,711
VEHICLE STORAGE SYSTEM
Filed May 11, 1928    12 Sheets-Sheet 10
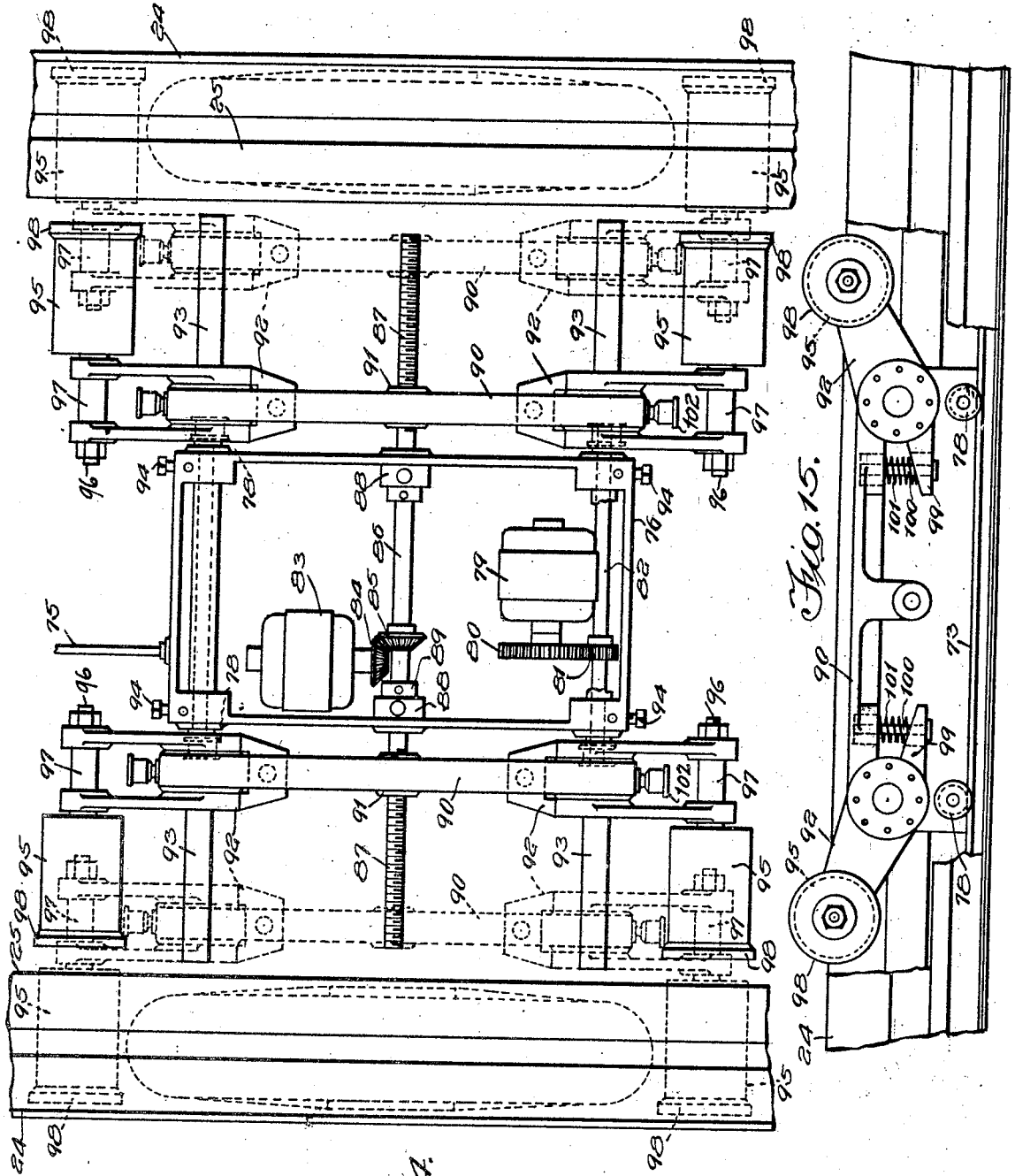

June 28, 1932.  S. E. BUETTELL  1,864,711
VEHICLE STORAGE SYSTEM
Filed May 11, 1928   12 Sheets-Sheet 11
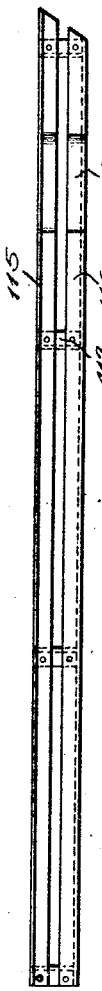
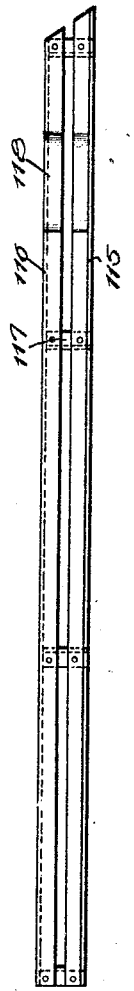
Inventor:
Samuel E. Buettell

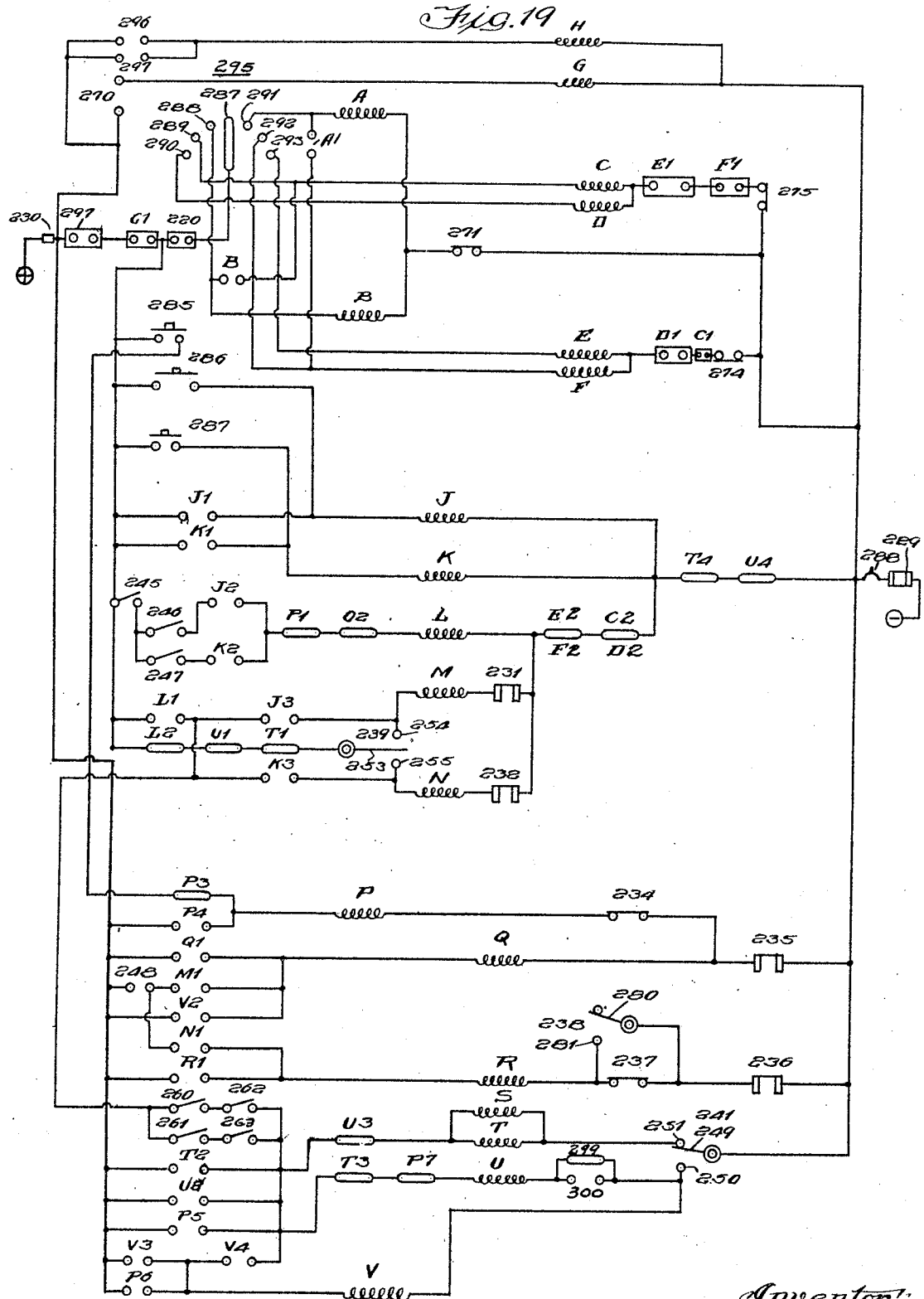

Patented June 28, 1932

1,864,711

UNITED STATES PATENT OFFICE

SAMUEL E. BUETTELL, OF CHICAGO, ILLINOIS, ASSIGNOR TO CROSS PARKING SYSTEMS, INC., OF CHICAGO, ILLINOIS, A CORPORATION OF ILLINOIS

VEHICLE STORAGE SYSTEM

Application filed May 11, 1928. Serial No. 276,931.

The present invention relates in general to vehicle storage systems and more particularly to such systems in which the vehicles are placed in storage and removed therefrom by the operation of automatic and semi-automatic machinery.

The problems encountered in storing automobiles vary as the location of the garage or storage structure varies. That is, in highly congested districts, it is necessary that the automatic equipment function in a garage structure having a great many stories in order to conserve the amount of land necessary. In residential and other areas where ground is cheap the storage structure can advantageously be built to cover a larger area with fewer stories. Again in residential and other areas there are often zoning ordinances which limit the height of the buildings. In residential areas also, it is not of great importance to have the automatic storing equipment function at its highest speed as it is in congested districts, because the volume of traffic is less and the times of storing and delivering a vehicle are not especially limited to the "rush" hours. Another consideration involved which makes it desirable to limit the height of the garage structure is the cost of the building structure. That is, a structure in the neighborhood of ten stories can be built of brick or reinforced concrete at a great deal cheaper cost than that necessary for high buildings where steel sky scraper construction is required.

In my prior application, Serial No. 272,169, filed April 23, 1928, I have disclosed a vehicle storage system that is particularly adapted for congested metropolitan areas where sky scraper construction is necessary, as well as high speed of automatic vehicle handling equipment. The present invention is particularly adapted to meet the requirements of storage systems in residential areas where the storage structure comprises a comparatively fewer number of stories and covers a greater area. The use of this equipment renders the storage structure a great deal more efficient than is usually the case, delivers the vehicle at a comparatively high rate of speed, reduces labor and maintenance cost to a minimum and is relatively cheap to install.

One of the objects of my invention is to provide novel automatic machinery for storing vehicles in a plurality of storage stalls on every floor, even though the storage stalls are not adjacent to the elevator hatchway.

Another object is to associate automatic vehicle handling machinery with the elevator and adapt it to move off the elevator on any storage floor to serve as many storage spaces as desired.

Another object is to provide automatic machinery that will function to store a car on either side of the storage structure when it moves off the elevator.

Another object is to provide automatic means for controlling the positioning of the automatic handling mechanism before any desired stall.

Another object is to provide automatic control means for the vehicle handling mechanism so that it will function to obtain a vehicle from any one of the plurality of stalls on any floor and then move onto the elevator.

Another object is to provide protective means for preventing movement of the elevator until the vehicle handling mechanism is moved thereon to.

A still further object is to prevent the vehicle handling mechanism from moving off the elevator until the elevator is automatically leveled at a particular floor.

Still another object is to provide means for preventing the vehicle handling mechanism moving into any storage space to place a car therein or retrieve a car therefrom, unless the vehicle handling mechanism is properly aligned with the stall.

There are other objects of my invention, which together with the foregoing will be described in the detailed specification which is to follow, taken in conjunction with the accompanying drawings.

In practicing my invention, I provide a relatively large elevator that might be termed a two position type. That is, the elevator is about 14 feet wide. The vehicle handling mechanism is adapted to serve four stalls on every floor, two on each end of the elevator hatchway, without moving off the elevator. A trackway is provided on each floor so as to permit the automatic handling mechanism on to the floor to position itself before any one of the stalls on either side of the runway. The speed at which this automatic vehicle handling mechanism must function in storing or retrieving a car can be readily determined by a study of the traffic conditions. In residential and other areas which the present system is adapted to serve, it is usually found that there is not a great peak load variation. In metropolitan areas, in order to take care of traffic, it is necessary that the automobiles be stored or retrieved in an approximate interval of one minute. In the present instance, it may be that two minutes or longer can be allowed for the functioning of the vehicle handling equipment. These traffic studies determine the number of stalls that the automatic handling mechanism can advantageously serve. When the number of stalls is arrived at, it is divided by the number of floors in the building and this gives the number of storage stalls on each floor that the elevator vehicle handling mechanism may serve. It will be seen that the number of these units, and consequently the number of elevators, since there is one vehicle handling mechanism on each elevator, can be determined readily. By various studies of the character, I have determined that the vehicle handling mechanism illustrated in the present invention will advantageously operate in a building of from one to fourteen stories. In higher buildings it is desirable that the vehicle handling equipment illustrated in my prior co-pending application above referred to be employed. The positioning mechanism carried by the elevator is adapted to receive a car at the loading station, draw it into position on the elevator, move it transversely either on the elevator or off the elevator into alignment with the proper stall when the predetermined floor is reached, and then discharge it into this stall. This vehicle handling mechanism is also capable of operating in a similar manner to remove a car from one of the storage stalls and deliver it at the delivery station. This automatic handling mechanism is of such nature that an elaborate type of building construction is not necessary, since the load of the stored cars may be carried directly by the building structure. It is also possible by the use of this handling mechanism equipment to bring the height of each story down to 9 feet 6 inches from slab to slab.

It will be appreciated that since the vehicle handling mechanism automatically moves the car, it is unnecessary to employ any chauffeurs to move the vehicle into the storage spaces. Again since the automobile engine is shut off at the loading station and not operated until the car is delivered, the fire insurance rates in a building structure of this character is greatly reduced, and in fact, is comparable with the fire insurance rate on any fire-proof building. In addition, since the car is automatically positioned in the predetermined storage racks or stalls, there is no possibility of the car being damaged in any way during the storing or delivering operations.

Referring now to the drawings:

Fig. 5 is a similar sectional elevation along the line 5—5 of Fig. 3, looking in the direction of the arrows;

Fig. 6 is a top plan view of the automatic vehicle handling mechanism showing the carrier frame, transfer frame and transfer truck;

Fig. 7 is a plan view of the carrier frame with the transfer frame and transfer truck, lifted therefrom;

Fig. 8 is an elevation along the line 8—8 of Fig. 6, looking in the direction of the arrows;

Fig. 9 is a sectional elevation through the transfer truck, transfer frame and carrier frame, and is taken along the line 9—9 of Fig. 6, looking in the direction of the arrows;

Fig. 10 is a plan view of the end portion of the carrier and transfer frames, showing the vehicle track extensions in operated position;

Fig. 11 is a similar view showing the track extensions in their inoperative position;

Fig. 12 is an end elevation of the vehicle handling mechanism, shown in Fig. 6;

Fig. 13 is a side elevation of the end portion of the carrier frame partially in section, showing the manner in which the track extension is supported upon a bracket;

Fig. 14 is a plan of the transfer truck that actually moves the vehicle;

Fig. 15 is an elevation of the transfer truck along the line 15—15 of Fig. 14;

Fig. 16 is a plan view of the tracks employed in the vehicle storage stalls and may be termed storage racks;

Fig. 17 is a side elevation of the storage rack shown in Fig. 16;

Fig. 18 is an end elevation of the same; and

Fig. 19 is a straight line diagram of the control circuits for operating the vehicle handling mechanism.

Figure 1:
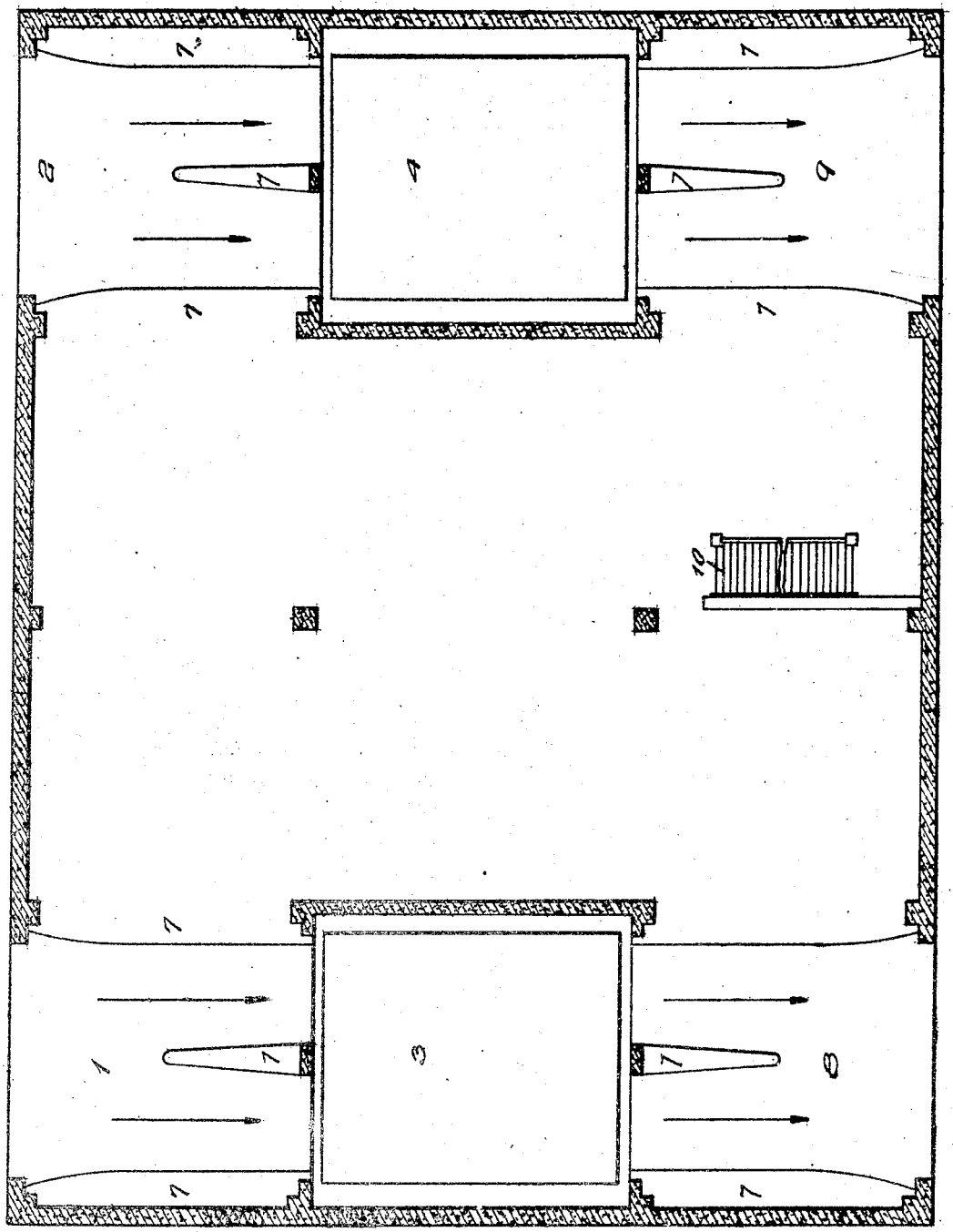
Fig. 1 is a ground floor plan of a typical garage of which my invention is installed.

While in the drawings my invention has been shown applied to a garage structure built in the form of a rectangle, with entrances on one side and exits on the other, it will be appreciated that it is not limited to a construction of this type, but may be applied to any form of garage, even those having entrances and exits on the same side. While only two elevators with their vehicle handling mechanisms are shown, one or more may be advantageously employed, depending upon the size of the ground that the garage is built on, the number of stories and the volume of traffic.

It will also be appreciated that this garage structure may form a part of a combination building, for example, a theatre, apartment, building or hotel.

In the accompanying drawings, like reference numerals refer to similar parts throughout. In Fig. 1 of the drawings, the plan of the typical garage structure shown is provided with two entrances 1 and 2 at each end of the building. These entrances open on driveways that extend to two elevators 3 and 4. The elevators are illustrated as being of the two position type, though one, two or three position elevators may be advantageously employed. As has been mentioned before, the particular type of vehicle storage system illustrated herein, is adapted to be advantageously employed in a building of from one to fourteen stories. It will be understood, of course, that in a single story building, no elevators are necessary and the vehicle handling equipment will move on the floor, as will appear subsequently. Automobiles entering through one of the entrances 1 or 2, drive in a position opposite one of the elevators under their own power. The automobile engine is then turned off, and the car may be locked in any manner desired. The automobile is not moved again under its own power until after delivery to the customer. Raised platforms 7 provide for properly aligning the wheels of the automobile so that they are in a stright line. These platforms are usually constructed of cement as an integral part of the floor. Each entrance, 1 or 2, may be provided with a door that is preferably automatically operated. Each elevator such as 3 is of sufficient width in the present instance, so that two cars might be placed thereon. However, the automatic handling mechanism carried by the elevator and permanently associated therewith, is adapted to handle only one car at a time, though by this mechanism it is possible to place an automobile into any one of the plurality of storage stalls on any floor, even though these storage stalls are not adjacent to the elevator hatchway, as will appear. The speed of these elevators is determined to a great extent by the exigencies of the particular garage in which they are located.

Exits 8 and 9 are provided at opposite sides of the building on the ground or loading floor and are ordinarily fitted with suitable doors that may be operated in any desirable manner. The floor is raised so as to form two trackways from each elevator to the exits. This insures that the vehicle will be properly guided toward the exits. The space on the ground floor of the building between the entrances and the exits may be used for storage racks, waiting rooms, repair shop, or the like; or again it might be used on the entrance side to provide additional entrances, inasmuch as the automobile handling mechanism is adapted to move from the elevator. Another suggested modification would be that the entrances and exits might be the same; in this case turn-tables would be provided so as to properly position the cars leaving the garage. The entrances or exits might be on different floors, for example, the entrances may be on the first floor and the exits in the basement. From the construction on the ground floor, it will be seen that the vehicle handling mechanism upon the elevators must be adapted to take a vehicle from one of the entrance positions and deposit it to any of the stalls on any floor, whether this stall is located adjacent to the elevator hatchway on either side of the building, or not, and to perform a similar operation in order to deliver a car.

A stairway 10 is usually provided in order to give access to the various floors for fire protection or other purposes. Each of the elevators moves in a shaft or hatchway which extends upward toward the top of the building. A by-pass type of fire door is provided on either side of the elevator on every floor, to provide entrances to storage stalls adjacent to the elevator hatchways. To provide means operative to permit the vehicle handling mechanism to move transversely off the elevator onto any storage floor, a by-pass type of fire door is provided at the side of the elevator. This fire door is of the truckable sill type and is cut away at points adjacent to the rails that the vehicle carrier runs on, and small sections of rail are mounted thereon in a manner that will appear. The elevators are constructed with their guides at the ends instead of the sides, as usual practice. The placing of the guides at the end of the elevator is necessitated by the fact that the vehicle handling mechanism moves off the elevator. This mounting of the elevator guides at the ends makes a two position type of the elevator, that is one about fourteen feet wide, the most advantageous since the least storage space is lost by this construction. The use of the fire doors as mentioned before, completely closes the elevator shafts, while the elevators are running. The two fire doors opposite one another on each floor do not have to be of the truckable sill type, for reasons that will be explained. The various fire doors on each floor may be automatically operated when the elevator comes to a position to receive a vehicle or discharge one, or to place one in storage.

So far as the building construction is concerned, it may be the usual type employed for lower buildings, where brick or reinforced concrete is employed. The individual storage stalls are simply made up of standard structural shapes, forming trackways adjacent to each other and arranged tier on tier.

Figure 2:
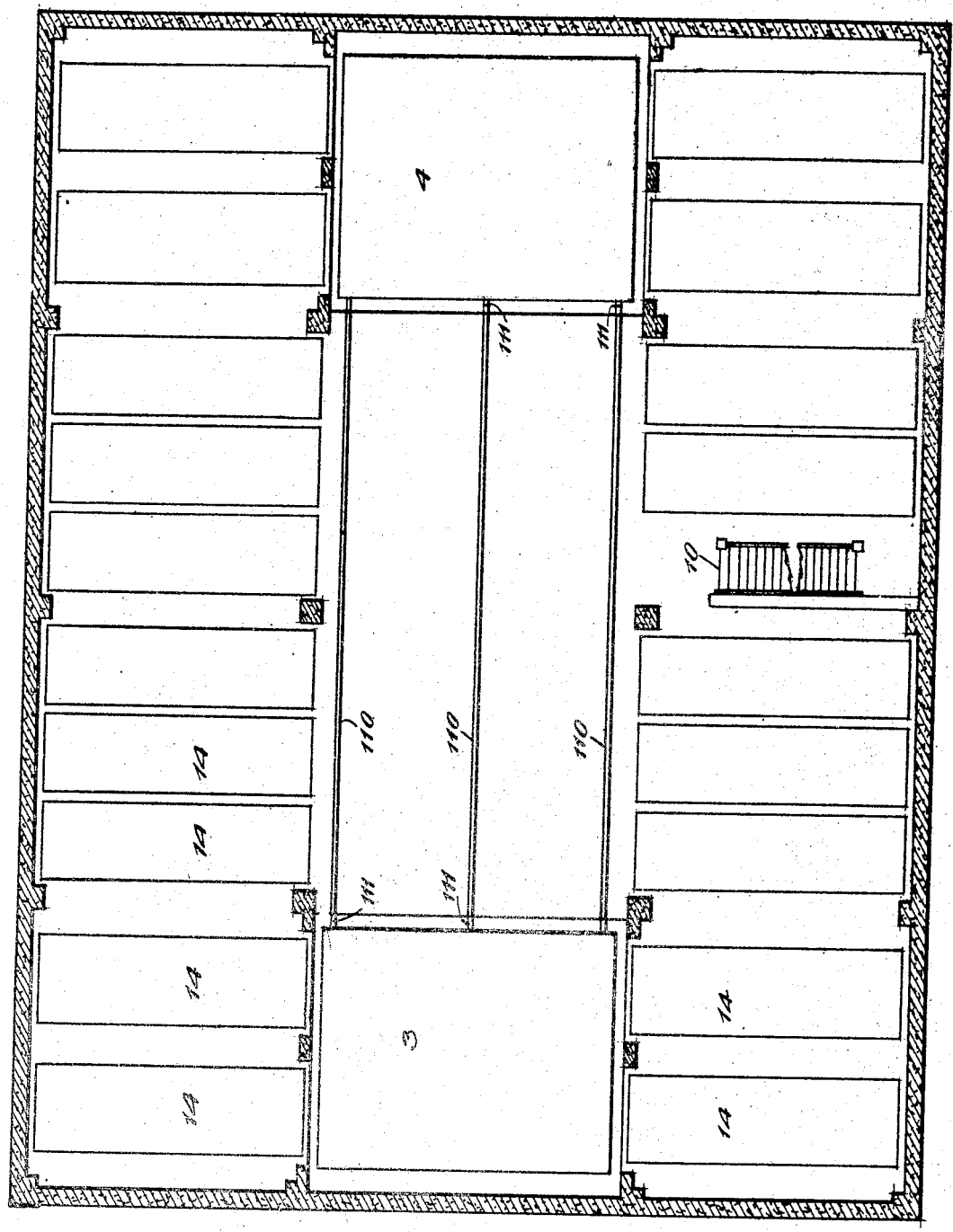
Fig. 2 is a typical floor plan of one of the storage floors in the garage of Fig. 1.

Fig. 2 illustrates a typical plan of one of the storage floors, showing the vehicle handling mechanism of each of the elevators 3 or 4 have access normally to ten stalls, five on each side. It will be appreciated that the vehicle handling mechanism on either elevator may move into the territory normally served by the vehicle handling mechanism on the other elevator, if for any reason it becomes desirable. It will be understood that each of the other storage floors are laid out in a similar manner. In the event that an elevator goes out of service, the vehicle handling mechanism on the other elevator can serve all stalls normally served by the mechanism on the other elevator, with the exception of the four stalls on each floor adjacent to the other elevator hatchway. If necessary, the cars stored in these four stalls may be moved to other stalls in any suitable manner such as by providing a sling arrangement that may be attached to the car and moving on the rails attached to the ceiling of the garage floor.

It will be appreciated that one elevator may be employed to serve the arrangement shown, unless the volume of traffic requires the installation of another elevator. The volume of traffic may require another elevator in certain types of buildings, in which instance, the elevator would be inserted between the elevators 3 and 4 illustrated. In this particular event, the vehicle handling mechanism on the middle elevator would be adapted to move in either direction off the elevator. Under these conditions, the elevator hatchway would be provided with four by-pass type fire doors on every floor.

Figure 3:
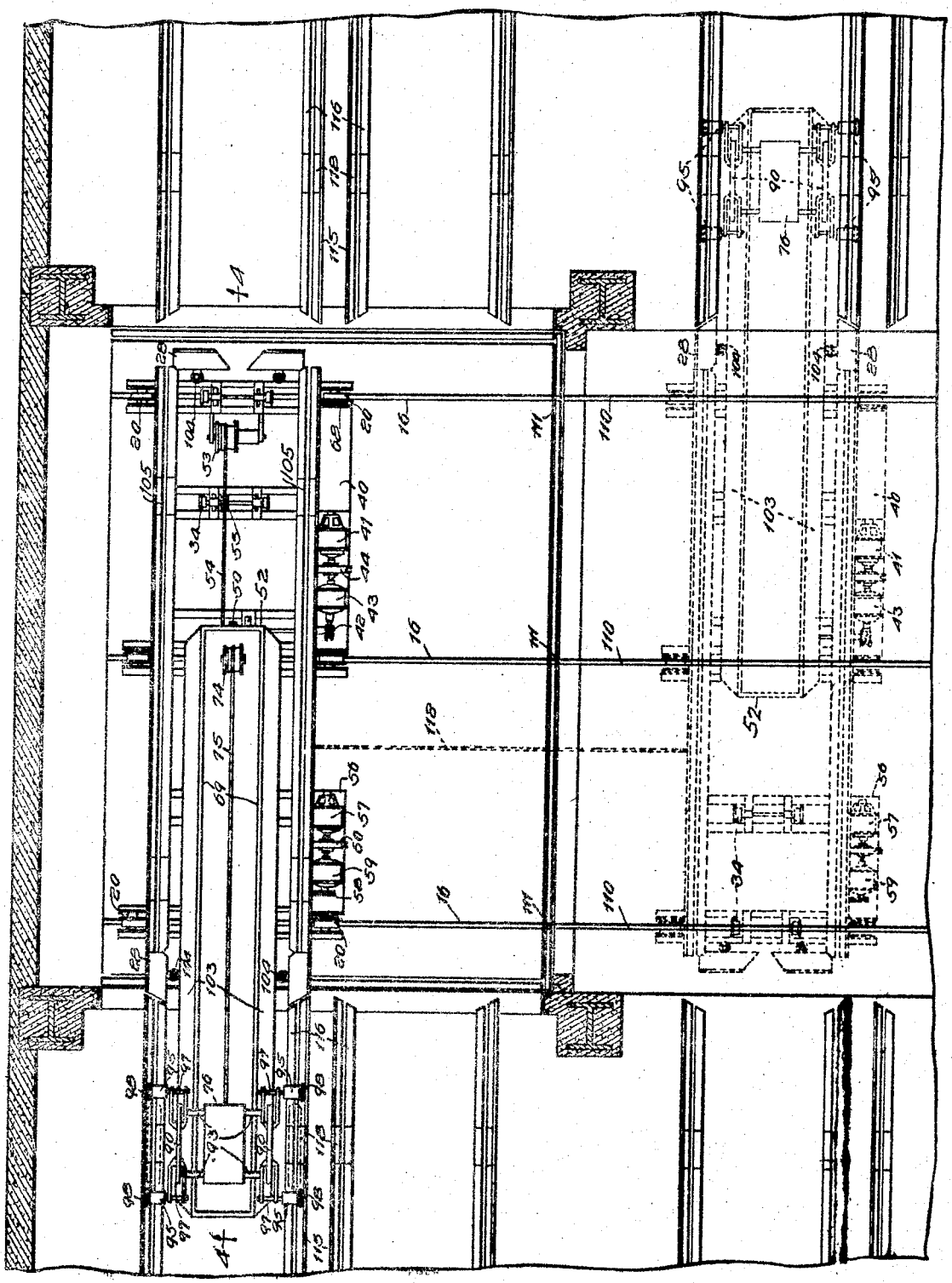
Fig. 3 is a top plan view of an elevator platform, showing in plan the automatic vehicle handling mechanism extended into a storage stall from the elevator with its position when moved off the elevator indicated by the dotted lines.
Figure 4:
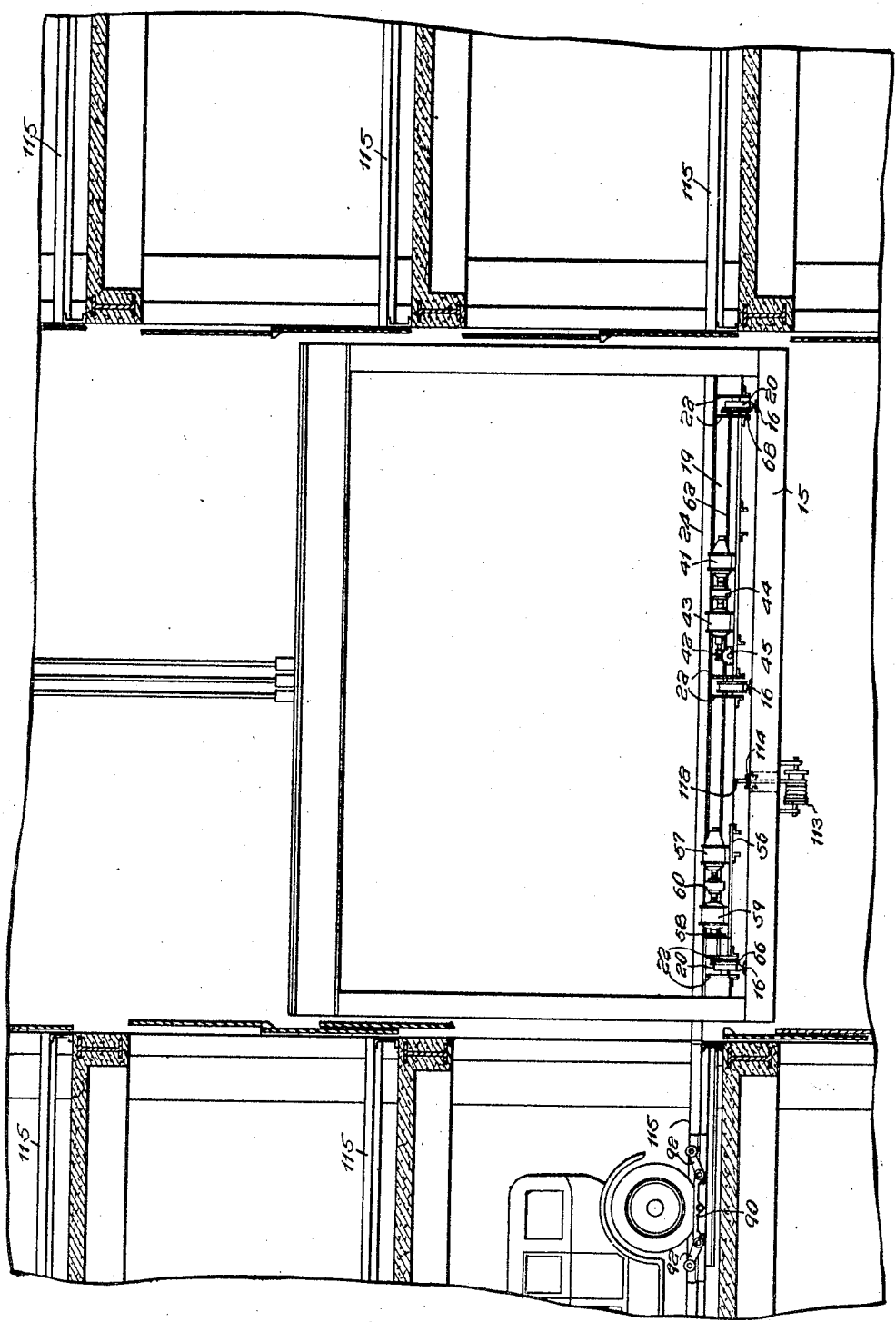
Fig. 4 is a partial sectional elevation through the garage elevator hatchway and the storing mechanism on one of the elevators showing the vehicle handling mechanism in position to place one of the cars in storage or to take one therefrom, being along the line 4—4 of Fig. 3.

Referring now to Fig. 4, a plan view of the vehicle handling mechanism extended into one of the stalls to the left of the elevator hatchway is shown. The vehicle handling mechanism is mounted upon an elevator platform 15, which is provided with three rails 16, running transversely to the stalls. The car handling mechanism comprises a carrier frame 19, which is built of standard structural shapes in the form of a rectangle, and is mounted upon flanged wheels 20, travelling on the rails 16. These wheels rotate in bearings 21, formed by two triangular-shaped structural members 22, extending beyond the carrier frame structure 19 itself, and firmly secured to this structure in any suitable manner. There are six of these flanged wheels, as may be seen in Fig. 3. The wheels 20 are preferably of roller bearing construction, in order to reduce friction. While I have shown six wheels supporting the frame 19, a smaller number may be employed. The carrier frame 19 carries on either side, automobile wheel tracks 23, which comprise two angles 24 and 25. The leg of the angle 24 being upstanding and the leg of the angle 25 being depending. The angles 24 and 25 are held to the carrier frame 19 by suitable bolts 26, fitting into slotted holes 27. The head of the bolts 26 are countersunk so that they are flush with the angles. The slotted holes are provided so that the angles 24 and 25 forming the trackways may be adjusted as to spacing between them so as to obtain a mean spacing that will accommodate all gauges of automobile wheels.

At each end of the carrier frame 19, there is provided two movable track extensions 28 (Fig. 10), that operate to bridge the gap between the tracks carried by the carrier frame and racks of the storage stalls. Each of the extension tracks 28 is carried upon a suitable triangular shaped bracket 29 (Fig. 12), that is pivoted upon a shaft 30, rotatably held in the bracket 31, bolted to the carrier frame 19. Slotted holes (not shown), are also provided, so as to permit adjustments as to the gauge between the extension tracks 28, the whole supporting bracket 29 being moved in this instance. Bearings 32 (Fig. 13), are preferably of the anti-friction type, taking both a thrust and a radial load. The extension tracks 29 are normally held in their inoperative position by spiral springs 33, fitting over the shafts 30, and having one of their ends fastened to the carrier frame 19, and the other ends affixed to the brackets 29, (Fig. 12). It will be appreciated that the extension tracks 28 are provided on either end of the carrier frame, and are constructed in identically the manner described. The manner in which these tracks are swung outward, into the position shown in Fig. 10, will be described subsequently. A plurality of flanged wheels 34, ten in number, are mounted upon suitable bearings 35 in brackets 36, attached to the cross members 37 of the carrier frame 19, (Fig. 7). An axle 38 connects each pair of wheels 34. The carrier frame 19 also has mounted upon it, electrical control equipment, comprising the various switches and relays necessary to control its operation. This control equipment may be mounted in the control boxes 39 on either side of the carrier frame 19, (Fig. 7). A platform 40 is mounted on one side of the carrier frame between brackets 22 supporting the flanged wheels 16. A 3 H. P. electric motor 41 is mounted at one end of this platform and serves to drive a worm 42 through the gear reducing mechanism 43 and a suitable brake 44. Both the gear reducing mechanism 43 and brake 44 may be of any well known or desired type. The function of the brake 44 is to stop the motor rotation when the motor circuit is opened. A worm gear 45 is mounted upon the shaft 46 and is adapted to mesh with the worm 42. The shaft 46 is mounted in suitable bearings 47 and 48 held in brackets 49 affixed to the cross members 37. The other end of the shaft 46 carries a pinion 50 which meshes with a rack 51, carried on the underside of the transfer frame 52, (Fig. 8). A cable reel 53 is suitably mounted on one end of the carrier frame 19 and carries a cable 54 that passes over the idler pulley 55 mounted upon one of the axles 38 connecting the wheels 34. The cable 54 is adapted to supply electric energy to the mechanism carried by the transfer frame and transfer truck. On the opposite end of the carrier frame 19, there is mounted a platform or bed plate 56, in any suitable manner. A 5 H. P. electric motor 57 is mounted upon the base or bed plate 56, and serves to drive a sprocket 58, (Fig. 8), through the medium of the gear reducing mechanism 59 and the brake 60. As before, the gear reducing mechanism and the brake may be of any suitable construction. The brake 60 is provided for bringing the rotation of the motor 57 to a stop at the proper time. The sprocket 58 is adapted to transmit power to the sprocket 61, mounted upon the shaft 62, which is held in suitable bearings 63 and 64 in the brackets 22.

A spur gear 65 is suitably splined to one end of the shaft 62 and is adapted to mesh with the spur gear 66 suitably affixed to the adjacent flanged wheels 20 so as to transmit power thereto. The other end of the shaft 62 has a spur gear 67 that is adapted to transmit power to the adjacent flanged wheels 20 through the spur gear 68. Power is thus transmitted from the motor 57 to the shaft 62 and thence to the flanged wheels 20 on either end of the carrier frame 19, to provide for the transverse movement of this unit. The platform 40 supporting the motor 41 is of sufficient length to provide standing space for the elevator operator, who rides with the carrier frame, (Fig. 6). Certain push buttons and control switches are mounted in a suitable manner upon this platform in order to permit the operator to control the movement and operation of the vehicle handling mechanism.

A transfer frame 52 is adapted to be mounted on and carried by the flanged wheels 34 attached to the carrier frame, (Figs. 8 and 9). The transfer frame 52 comprises two channel members 69, suitably bolted to a plate 70. Suitable angles 71 are bolted to the channels 69 with their upstanding legs forming a track upon which the transfer frame 52 rests on the flanged wheels 34 carried by the carrier frame 19. Racks 72 extending the whole length of the transfer frame 52 are mounted upon the upper side of the plate 70 in any suitable manner, (Fig. 6). Two rails 73 suitably spaced apart also extend the full length of the transfer frame and are suitably mounted on the plate 70. A cable reel 74 of standard construction carries a cable 75 that is adapted to supply energy to electrical equipment carried by the transfer truck 76.

The transfer truck 76 comprise essentially a steel casting 77 (Fig. 9), that is supported on four flanged roller bearing wheels 78 (Figs. 9 and 14) that run on the rails 73, supported by the platform 70 of the transfer frame 52. A motor 79 is mounted on the steel casting 77 and is adapted to drive a spur gear 80 that meshes with the spur gear 81 mounted on the shaft 82 connecting the roller bearing wheels 78. The pinions 81' mounted upon the shaft 82, mesh with the racks 72, mounted upon the platform 70 of the transfer frame 52, (Fig. 9). The operation of the motor 79 is thus adapted to drive the transfer truck 76 longitudinally of the transfer frame. An electric motor 73 is suitably mounted on the transfer truck structure 77 and drives a bevel gear 84. The bevel gear 84 is adapted to mesh with the bevel gear 85, splined to the shaft 86, which is formed on either side, into the roller arm spreader screws 87. The shaft 86 is supported on the truck frame 77 by means of bearings 88 which may be of the anti-friction type and are kept from shifting by collars 89, (Fig. 14). On either side of the truck, there is positioned a roller arm spreader 90 which is adapted to be moved in and out by the operation of the screws 87 and the bushed nuts 91, suitably mounted in the roller arm spreaders 90. At each end of the roller arm spreaders 90, there is rotatably fastened a roller arm 92. A roller arm guide shaft 93 is positioned at each end of the truck, projects on either side, and is adjustably held in place by the set screws 94. At the end of each roller arm 92, there is rotatably mounted a roller 95 on a shaft 96, the open ends of the roller arms 92 being held against inward movement by tubular sleeves 97. At each end of each roller shaft 96, there is provided a roller idler wheel 98 of slightly larger diameter than the diameter of the roller 95. The four rollers 95 carried by the transfer truck are adapted to engage a set of the vehicle wheels when in extended position, as shown by the dotted lines. The idler rollers such as 98 are for the purpose of reducing the friction encountered in moving the vehicle as they take the load of the car. In order to maintain the roller arms 92 in their proper position, these roller arms are provided with extensions 99, through which are fitted pins 100 that serve as guides for the roller arms springs 101, (Fig. 15). These springs serve to thrust the roller arms 92 and consequently the rollers 95 upward. Suitable grease cups 102 may be provided for proper lubrication. A control switch (not shown), having two positions, being in one position when the roller arms are normal and in another position when the roller arms are extended, is provided for the purpose of operating certain control circuits as will appear. The mechanical construction of this switch is immaterial and its electric function will be described subsequently. A cover plate 102' (Fig. 9), is fastened to the transfer truck casting 77 and serves to enclose the motors 79 and 83, as well as the other mechanism to protect it from dirt and injury.

The transfer frame 52 carries attached to the channel members 69, two angles 103, having their longer legs extending outwardly, (Fig. 9). The ends of these angles are somewhat rounded as may be seen in Fig. 10, so as to provide a cam surface for the rollers 103 mounted in the brackets 104, attached to the angles 29, supporting the extension tracks 28. It will be seen that by this construction, when the carrier frame is extended in one direction, the track extensions 28 are swung into alignment with the tracks 23 of the carrier frame, in order to bridge the gap between the carrier and a storage rack, as will appear. When the transfer frame is extended in the other direction, the extension tracks 28 at the other end of the frame, are operated in substantially the same manner.

The vehicle tracks 23 on the carrier frame which are formed by angles 24 and 25, are separated somewhat, and this separation serves as a guide for the automobile wheels. These tracks also carry concave depressions 105 at one end, (Fig. 3), the carrier frame I beams 19 being cut away to permit the formation of these depressions. These depressions are for the purpose of maintaining the automobile in position upon the carrier frame, even when the rollers 95 of the transfer truck 76 are not in position adjacent to the vehicle wheels.

The electrical circuits are controlled by switches that are mechanically operated through the movement of the vehicle handling mechanism. These switches may be placed in any position that is desired and their function will be described when the electrical control circuits are explained. There is a limit switch that is adapted to be operated only when the transfer frame is extended in the position under a vehicle at the loading station and the vehicle is properly positioned at the loading station. The functioning of all this equipment will be more specifically described in the discussion of the electrical operating circuits.

In order to provide stalls for the vehicles, a plurality of racks are employed which form trackways supported above the floor in each of the storage stalls 14. The construction of the racks can be seen in Figs. 16 to 18, inclusive. The vehicle tracks are formed by angles 115 and 116, being laid parallel to each other and bolted in place on channel brackets 117. The angles 115 and 116 forming the trackway are held in position by clips so that their spacing may be altered to compensate for variations in the wheel gauge of automobiles. I have found that by the use of this angle type of track counstruction, a mean spacing may be employed which will fit all gauges of vehicle wheels. There is a rounded depression 118 in each of the tracks in the vehicle stall and this depression serves to prevent the movement of the vehicle. The location of the depressions 118 in the wheel tracks formed by the angles 115 and 116 of the storage racks may vary, depending upon whether the rear or the front wheels of the vehicle would rest in the depressions, when placed in storage in any of the racks on one side of the building. Thus, on one side of the building, the front wheels of all stored vehicles would rest in these depressions and on the other side of the building the rear wheels of all stored vehicles. Since the rear overhang of an automobile is greater than the front overhang, it will be seen that the depressions in the racks on one side of the building, will be different than on the other. This variation is provided for in the electrical control circuits, as will appear. The ends of the tracks facing the carrier frame are cut diagonally so that the swinging track brackets 28, the ends of which are cut on a complementary angle, form a continuous trackway from the vehicle storage stalls to the tracks of the carrier frame, (Fig. 10). This permits the automobile to be moved from the carrier frame 19 to the storage stall over the continuous trackway and eliminates the use of the truckable sill type of fire door. By forming the trackways of angles, such as 115 and 116, (Figs. 16, 17 and 18), a great deal of friction between the automobile tires and the trackway is eliminated. That is, there is only the possibility of the automobile tire encountering one upstanding leg of the trackway instead of both. This permits the car to be moved with a minimum application of power.

I shall now briefly outline the operation of the car handling apparatus in taking a car from the loading station to a storage stall and from a stall to the delivery station and shall then give a detailed description of the electrical circuits controlling the functioning of the car handling equipment, together with the operation of the equipment.

It will be assumed that a customer drives his automobile into one of the entrances of the garage, such as 1, (Fig. 1), and places the car at the loading station before elevator 3, with the front wheels properly positioned so as to prepare an operating circuit for the motor controlling the roller arm spreaders. In order to load the car, if the carrier frame is not positioned in alignment with the vehicle at the loading station, the elevator operator will move his controller to the right or left, depending upon the direction of his travel and the motor 57 will be operated to apply power to the wheels 16, to move the carrier frame 19 transversely into alignment with the loading position of the vehicle. When in the loading position, as determined by the operation of the limit switch, controlled by the carrier frame 19, the circuit of the motor 57 is opened and the brake 60 is operated to bring the carrier frame to rest before the car with the trackways 23 on the carrier frame in alignment with the vehicle wheels. The vehicle wheels are properly directed by the raised parts of the floor 7 in the entrance way. The transfer frame 52 is now extended by the operation of the motor 41, the pinion 50 and rack 51. Simultaneously therewith, the motor 79 is energized to drive the transfer truck 76 toward the end of the transfer frame that is extending through the medium of the pinion 81 and the rack 72. By the operation of the motor 41, the transfer frame 52 is extended until it assumes the position with its end under the front end of the vehicle. The limit switch is then operated to de-energize the motor 41 and operate the brake 44. The motor 79 is operated until the transfer truck 76 has been driven to the limit of the transfer frame, the load of the transfer truck being carried by the wheels 78 and the transfer truck being propelled through the medium of the pinion 81 and the rack 72. When the transfer truck reaches its limit, the motor 79 is de-energized and the forward movement of the truck 76 ceases. The transfer frame 52 has its load supported on the ten wheels 34 and is propelled by the pinion 50 and the rack 51. When the transfer truck and transfer frame have been positioned, as described, the rollers 95 are in position adjacent to the front wheels of the vehicle. Now if the vehicle is properly positioned at the loading station, a switch on the transfer frame is operated to bring about the completion of a circuit for the motor 83. It will, of course, be understood that as the transfer frame is extended in position, the cammed ends of the angles 103 engage the rollers 104 and the extension trackways 28 swing out into alignment with the carrier vehicle tracks 23. The operation of the motor 83 extends the roller arm spreaders 90 on either side so that the rollers 95 are projected on either side of the front wheels of the vehicle. The motor 83 is then de-energized and a circuit is made up for energizing the motor 41 and the motor 79. The motors 41 and 79 operated to move the transfer frame 52 and the transfer truck 76 in the manner described. The transfer truck and transfer frame now co-operate to move the vehicle onto the tracks 23 of the carrier frame. The movement of the transfer frame is stopped when it reaches its center position. The movement of the transfer truck ceases when the back wheels of the vehicle strike the depression 105 in the tracks 23 in a manner that will appear. This places the vehicle with its rear wheels in a certain definite position on the carrier frame. When the transfer frame 52 reaches its center position, the operation of the springs 33 serve to swing the brackets 29, carrying the track extensions 28, back to their normal unextended position. It will be noted that the roller arms 92 are pivoted on the ends, the roller arms spreaders 90 being forced upwardly by the tension of the springs 101. This construction permits the rollers 95 to follow the track discrepancy, should there be any variation in the level, also if the elevator is not also level. The idler rollers 98 support the load of the vehicle and permit the rollers 95 to turn with the wheels, should the wheels be locked or have any tendency to bind. This construction prevents the car from raising up over the rollers under these conditions. By this construction, it is possible to move the car, even though all four wheels are locked.

The elevator operator may now raise the elevator to the proper floor on which he desires to store the car. When the elevator reaches this floor, the three fire doors on this floor may be automatically opened. The elevator operator will now operate his carrier controller in such direction, so as to bring about the transverse movement of the carrier frame 19, through the medium of the motor 57, which applies power to the wheels 16. The motor 57 is operated only if the elevator is properly leveled and the doors are properly opened. In moving off the elevator, the carrier frame 19 moves onto rails 110 on each floor which extend transversely of the building. The gap between the elevator and the floor is bridged by a truckable sill type door, which is cut away at three points, and sections of rail 111 provided therein, (Fig. 3). Power is transmitted to the carrier frame by the cable 112 from the cable reel 113 attached to the under side of the elevator platform 15. The cable 112 is brought over an idler pulley 114 in an obvious manner. When the carrier frame 19 is in alignment with the proper stall, the motor 57 is de-energized and the brake 60 operated to stop the transverse movement thereof. The transfer frame 52 and the transfer truck 76 are now operated to move the vehicle into position in the proper stall, assuming that the elevator operator desires to place the car in storage upon the same side of the building as the loading station is on. The vehicle is moved into the storage rack (such as is shown in Fig. 16), until its front wheels rest in the depressions 118 in the track. The motor 83 on the transfer truck is then operated to withdraw the roller arm spreaders 90, and consequently the rollers 95 from position on either side of the front wheels of the vehicle and the transfer frame is moved back to normal by the operation of the motor 41. The elevator may then be returned to the loading floor.

This is the normal operation in the event a vehicle is stored in one of the storage stalls on the same side of the building from which it was loaded. The operation is somewhat different, in the event that the elevator operator selects a stall on the opposite side of the building. In this event the operator will push a transfer button, during the upward movement of the elevator, which will bring about the energization of the truck motor 83, so as to withdraw the rollers 95 from position on either side of the front wheels of the vehicle. The car is held in position on the carrier frame by the depressions 105 in the trackway 23. When the roller arms have assumed their normal position, the motor 79 is energized to drive the transfer truck 76 to the other end of the transfer frame into position opposite the rear wheels of the vehicle. The transfer truck motor 83 is now operated to bring about an extension of the roller arms until the rollers 95 are on either side of the rear wheels of the vehicle. When the proper storage floor is reached, the three doors, two of which give access to the two storage stalls on either side, are opened, as well as the third door carrying the truckable sill. The carrier 19 is then moved under control of the elevator operator into alignment with the proper stall, and the transfer frame 52 and the transfer truck 76 are operated to run the vehicle into the predetermined stall or rack with the rear wheels of the vehicle resting the track depressions 118 in the stall racks. The transfer truck motor 83 is then operated to withdraw the roller arms to their normal position. The transfer frame 52 is then returned to its normal position by the operation of the spiral springs 33, as the transfer frame goes into its normal position, (Figs. 10 to 13). The elevator may now be returned to its loading floor in any well known manner.

It will be understood, of course, that the elevator operator can move the carrier frame and the vehicle into alignment with any one of the storage racks in the stalls adjacent to the elevator hatchway. The operation is essentially the same as has been described.

When it is desired to withdraw a vehicle from storage, the elevator operator moves his elevator to the proper floor and then operates his controller to bring about the movement of the carrier frame 19 until it is aligned with the proper stall. The transfer frame and transfer truck are then projected into the storage rack until the rollers 95 are positioned adjacent to one set of wheels of the vehicle. The transfer truck motor 83 is then energized to extend the roller arms until the rollers 95 are on either side of the vehicle wheels. After this operation, the transfer frame and transfer truck are operated so as to bring the vehicle onto the carrier trackway in substantially the same manner as before. The elevator may then be dispatched to the discharging floor, the doors on the storage floor closing automatically. When the elevator reaches the delivery floor, the operator may move the carrier 19 until the vehicle tracks 23 are in alignment with the exit and will then operate the transfer truck and transfer frame to roll the car into the delivery station. The transfer truck motor 83 is now operated to withdraw the rollers 95 from position on either side of the rear wheels of the vehicle and the transfer frame is moved to its center position on the carrier frame.

In the event that an automobile is taken from a storage stall on a side of the garage opposite the discharge station, the transfer truck 76 is positioned upon the vehicle carrier 19 in substantially the same manner as before described. The other operations all occur as set forth.

Attention is directed to the fact that since one set of vehicle wheels of the car are always placed in a predetermined position on the carrier frame tracks, the variation in the wheel base of the vehicle does not interfere in any way with functioning of the automatic handling equipment.

It will be understood that there are certain protective arrangements and circuits provided so that the elevator cannot be moved when the transfer frame is in extended position, nor can the carrier frame be moved transversely at this time. Also the elevator cannot be moved while the transfer frame is out on a floor, nor can the carrier frame move transversely when the transfer frame is extended. It is also necessary that the elevator be approximately level with the desired floor and that the doors thereat be properly opened in order to bring into play the functioning of the automatic equipment.

The manner in which the electrical circuits function to bring about the operation of the vehicle handling equipment will now be described. In order to do this, it will be assumed that the elevator 3 is opposite the loading floor and in position to receive a car. It will be assumed further that the automobile is positioned before the elevator upon the right hand side and that the carrier frame 19 is in the left hand position on the elevator.

Under these conditions, the operator will move his controller 295 to bring the contact making member 287 into engagement with the contact member 291. Now, if the elevator is properly leveled at the floor and the doors properly opened, there is a circuit completed which extends from the positive side of the line fuse 230, switch 297, contacts G—1, switch 220, contact making member 287, contact member 291, relay A, limit switch 271, emergency stop switch 288 and fuse 229 to the negative side of the line. The switch 220 determines that the transfer frame is properly centered on the carrier frame. The contacts G—1 are closed only when the relay G is de-energized. This relay is operated through the switch 270 whenever the elevator is running. The switch 297 is closed when the doors are properly opened. The above circuit is closed when all these conditions have been made to bring about the energization of the relay A. The relay A operates to establish a circuit for the relay F, over a path that extends from the positive side of the line, fuse 230, switch 297, contacts G—1, switch 220, contact making member 287, contact member 291, contacts A—1, relay F, normally closed contacts D—1, normally closed contacts C—1, limit switch 274, emergency stop switch 288 and fuse 229 to the negative side of the line. The relay F is energized over this circuit and serves to complete a circuit for the motor 57 in such manner that the motor is rotated at a comparatively slow speed. The operation of the motor 57 drives the carrier frame transversely across the elevator into alignment with the vehicle about to be loaded. At this position, the limit switch 271 is operated by a cam, and the circuit of the relay A is opened. The relay A is de-energized to open the circuit of the relay F, which retracts its armature to open the circuit of the motor 57. The carrier frame 19 is now properly positioned in alignment with the vehicle. The operator will now depress the push button 286 which serves to complete a circuit extending from the positive side of the line fuse 230, switch 297, contacts G—1, push button 286, relay J, contacts T—4, contacts U—4, emergency stop switch 228 and fuse 229 to the negative side of the line. The relay J is operated over this circuit and serves to establish a locking circuit for itself at the contacts J—1. There is now a circuit completed for the relay L, providing the carrier frame 19 is properly aligned. This is controlled through the cam switch 245, which is carried by the carrier frame and is operated by a cam adjacent to each loading position, also by a cam adjacent to each storage stall. It will be assumed that the carrier frame 19 is in proper alignment and that the contacts of the switch 245 are closed. The switches 246 and 247 are controlled by a cam on the door of the elevator hatch at every floor, including the loading floor and these switches are closed if the door is open and the elevator properly leveled either automatically or by hand. There is now a circuit completed which extends from the positive terminal of the source of energy, fuse 230, contacts 297, contacts G—1, contacts of the switch 245, contacts of the switch 246, contacts J—2, which have been closed by the operation of the relay J, normally closed contacts P—1, normally closed contacts O—2, time element or dash pot relay L, normally closed contacts E—2, normally closed contacts C—2, normally closed contacts T—4, normally closed contacts U—4, emergency switch 288 and fuse 229 to the negative terminal. The relay L is a timing relay and takes a short interval of time to operate its contacts. When the relay L operates, there is a circuit completed which extends from the positive terminal, fuse 230, contacts 297, contacts G—1, contacts L—1, contacts J—3, relay M, transfer frame east limit switch 231, normally closed contacts E—2, normally closed contacts C—2, normally closed contacts T—4, normally closed contacts U—4, emergency stop switch 288, and fuse 229 to the negative terminal. The relay M is energized over this circuit and serves to complete a circuit for the motor 51 in such direction as to direct the transfer frame eastward into the loading pit. The motor 51, has the usual accelerating resistances and the switch 248 is closed through the operation of the accelerator on motor 51. A circuit is thereupon completed, extending from the positive terminal, fuse 230, contacts 297, contacts G—1, switch contacts 248, contacts M—1, relay Q, limit switch 23, emergency stop switch 288, and fuse 229 to negative terminal. Limit switch 235 determines the eastward movement of the transfer truck. The relay Q is energized and operates to complete a circuit for the motor 75 in such direction as to drive the transfer truck 80 to its eastward position. The speed of the motor 79 is such as to drive the transfer truck 76 to its outward limit before the transfer frame motor 41 has extended the transfer frame to its outward position. When the transfer truck reaches its limit the switch 235 is operated and the relay Q is de-energized to open the circuit of the motor 79 and stop the operation of the transfer truck 76. When the transfer frame is extended to its proper position, the switch 231 is opened and the relay M is de-energized to open the circuit of the motor 41 and to complete a circuit for the brake 44. When the relays M and Q have de-energized, there is a circuit completed which extends from the positive terminal fuse 230, contacts 297, contacts G—1, contacts L—1, contacts of switch 260, contacts of switch 262, normally closed contacts T—3, normally closed contacts P—7, relay U, contacts of the switch 299, contact member 250 of the switch 241, contact making member 249, emergency switch 288 and fuse 229 to the negative terminal. The switch 260 is closed when the transfer frame is extended into its furthermost east position and the switch 261 is closed when the transfer frame is extended to its furthermost west position. The switch 262 is closed when the transfer truck is extended to its furthermost east position and the switch 263 is closed when the transfer truck is in its furthermost west position. The switch 300 is on the transfer frame and is operated by the trigger switch 113 located in the loading pit if the wheel of the vehicle is properly positioned therein, the switch 299 having been opened at the loading floor by the operation of a door cam. The switch 241 has its contact member 249 in engagement with the contact member 250 since the roller arms or roller arm spreaders are in their normal unextended position. The relay U is immediately operated to complete a circuit for the motor 83 in such direction as to bring about an extension of the roller arms so that the rollers 95 are on either side of both front wheels of the vehicle. When in this position the switch 241 is operated so that its contact making member 249 is swung into engagement with the contact member 251, whereupon the relay U is de-energized to open the circuit of the motor 83. When the relay U is operated the circuit of the relay L is opened at the contacts U—4 and the relay L is de-energized. When the transfer frame is into its east extended position, the switch 239 has its contact making member 253 in engagement with its contacts member 255. Now when the relay U is de-energized, there is a circuit completed which extends from the positive side of the source of current, fuse 230, contacts 297, contacts G—1, normally closed contacts L—2, normally closed contacts U—1, normally closed contacts T—1, contact making member 253, contact member 255, relay N, limit switch 232, normally closed contacts E—2, normally closed contacts C—2, normally closed contacts T—4, normally closed contacts U—4, emergency stop switch 288, and fuse 229, to the negative terminal of the source of current. The limit switch 232 is adapted to be operated when the transfer frame is extended into its furthermost west position. The relay N is operated to complete a circuit for the motor 41 in such direction that the transfer frame 52 is moved in westward. The operation of the accelerator closed the contacts of the switch 248 and there is a circuit completed by way of these contacts, contacts N—1, relay R, contact member 281 of switch 238, contact making member 280 of said switch, limit switch 236, and thence to the negative terminal. The limit switch 236 is operated when the transfer truck reaches its furthermost west limit on the transfer frame. The switch 238 remains with its contact making member 280 in engagement with its contact member 281 until the transfer truck passes its middle position when these contacts are opened. The switches 237 and 234 are adapted to operate their contacts when the vehicle wheel engages them, the switch 234 closing and the switch 237 opening. When the front vehicle wheels engage the switch 237, its opening has no effect since the circuit for the relay R passes through the switch 238. However, when the transfer truck passes its center position, the switch 238, is opened and when the rear vehicle wheels rest in the depressions 105, the opening of the switch 237 opens the circuit of the motor 79 operating the transfer truck. It will be noted that since the circuit of the transfer truck motor 79 is not completed until the accelerator of the transfer frame motor operates, the transfer frame motor overcomes the inertia of the vehicle and starts it moving. The transfer truck motor 79 is then cut in and the speed of movement of the vehicle is increased since the transfer truck motor is adapted to move the transfer truck considerably faster than the transfer frame is moved and the relay R is de-energized to bring about the de-energization of the transfer truck motor 79 before the transfer frame motor 41 stops. This slows down the movement of a car and absorbs some of its momentum. When the transfer frame 52 reaches its center position the switch 239 is operated so that its contact making member 253 swings into normal or open position opening the circuit of the relay N. The relay N is de-energized to open the circuit of the motor 41 and to complete the circuit of the brake 44. The vehicle has now been loaded on the carrier frame into its normal position.

The operator may now place it in any desired vehicle stall, accessible to the elevator on any floor.

For the purpose of this description, it will be assumed that the elevator operator desires to place a car in one of the end stalls, accessible to the elevator on the same side of the garage, as the loading station is located. The floor that the stall is located on, is immaterial so far as the operation is concerned. The elevator operator will send his car to the predetermined floor in any usual manner. When the desired floor is reached, and the elevator is properly leveled thereat, and the three doors on this floor are opened, the elevator operator may move the carrier into alignment with any stall on the floor, except those in the hatchway of another elevator, if there is one. If the stall in which the car is to be stored, is a considerable distance from the elevator on the floor, the elevator operator will swing the contact making member 287 of the controller 295 into engagement, first with the contact member 292 and then the contact member 293. By the engagement of the contact making member 287 in engagement with the contact member 293, there is a circuit completed for the relay E. The relay E is adapted to energize the motor 57 over a circuit that operates this motor at its highest speed. The operation of the motor 57 serves to drive the carrier frame 19 transversely across the elevator platform and then onto the rails 110 on the storage floor toward the proper stall. Some time before coming to the proper stall, the elevator operator will move the contact making member 287 into engagement with the contact member 292, whereby a circuit is completed for the relay F. The relay F is adapted to energize the motor 57 over a circuit that brings about its operation at a considerably lower speed than before. Just before coming into alignment with the proper stall, the elevator operator will move the contact member 287 into engagement with the contact member 291. This brings about the energization of the relay A and the continued operation of the relay F, through the contacts A—1. Now when the switch 271 is operated by engaging a cam associated with the next stall, the relay A is de-energized to open the circuit of the relay F and stop the transverse movement of the carrier frame 19 in alignment with the predetermined stall. In order to store the car, the elevator operator will then depress the push button 286 to complete a circuit for the relay J. The relay J is energized to establish a locking circuit for itself at the contacts J—1 and to complete a circuit for the relay L, provided the contacts of the aligning switch 245 are closed, which occurs if the carrier is adequately aligned, and the elevator has reached the proper floor, is leveled thereat with the doors to the proper stall opened. This is all controlled by the switches 245 and 246 in the manner described. Relay L operates after a short interval of time to complete a circuit for the relay M through the contacts L—1 and J—3. The relay M is operated to complete a circuit for the transfer frame motor 41 in such direction as to project the transfer frame into the preselected storage stall. By the operation of the accelerator associated with motor 41, the switch 248 is closed and there is a circuit completed through the contacts M—1 for the relay Q. The relay Q is operated to energize the transfer truck motor 79 so as to drive the transfer truck 76 in the same direction as the transfer frame is moving. The rollers 95 which are extended, engage the wheels of the vehicle and move the vehicle along the trackway 23 of the carrier frame and into the trackway of the vehicle stall. It will be noted here that the transfer frame motor 41 first serves to start the car in motion and then after the inertia of the vehicle is overcome, the transfer truck motor 79 is operated. By reasons of the differences in the motor speeds, the transfer truck reaches its extended position first and the limit switch 235 is operated to open the circuit of the relay Q. The relay Q is de-energized to open the circuit of the motor 79. When the transfer frame 52 reaches its extended position, the limit switch 231 is operated to open the circuit of the motor 41 and to bring about the operation of the brake 44. The vehicle is now positioned with its front wheels in track depressions 118 in the tracks in the storage stall. Now when the transfer frame and transfer truck are in the furthermost east extended position, there is a circuit completed from the positive terminal of the source of current, fuse 230, contacts 297, contacts G—1, contacts L—1, contacts of the switch 261, contacts of the switch 263, normally closed contacts U—3, relays S and T in multiple, contact member 251 of switch 241, contact making member 249 of said switch, emergency stop switch 288 and fuse 229 to the negative terminal of the source of current. The relay S is a timing relay and the two relays, S and T, when both are operated, complete a circuit for the roller arm motor 83 on the transfer truck. The reason that the timing relay S is employed, is to give the vehicle, time to center itself in the track depressions before the circuit of the motor 83 is completed. Motor 83 operates to move the roller arm spreaders 90 inwardly so as to remove the rollers 95 of the transfer truck from position on either side of the vehicle wheels. When these rollers reach their normal unextended position, the switch 241 is operated to swing the contact making member 249 in engagement with the contact member 250. The relay T operates to establish a locking circuit for itself through the contacts T—2 and opens the circuit of the relay L at contacts T—4. The relay L is de-energized to open the original energizing circuit of the relays T and S. Now upon the operation of the switch 241, the relays T and S are de-energized to open the circuit of the motor 83. In addition, the de-energization of the relay T brings about the completion of the circuit for the relay N through the switch 239. The relay N is energized to operate the motor 41 in such direction as to drive the transfer frame toward its normal position. When the transfer frame reaches its center position, the switch 239 is operated to open the circuit of the relay N and this relay retracts its armature to open the circuit of the motor 41 and to operate the brake 44.

The operator will now move his controller so as to bring about the engagement of the contact making member 287 with the contact member 290, whereby the relay D is energized. The operation of the relay D serves to complete a circuit for the motor 57 to drive the transfer frame 19 onto the elevator, the elevator operator moving the contact making member 287 into engagement with the contact making member 289 and then the contact member 288 to stop the operation of the motor 57. If the elevator operator fails to perform the proper operations in the controller, the limit switch 275 will be operated in order to bring about the stopping of the carrier shortly after the carrier reaches the elevator. The limit switch 274 in series with the circuit of the relays E and F function to perform a similar operation, if the elevator operator neglects to properly position the contact making member 287 of the controller 295 when the carrier frame 19 reaches its furthermost limit adjacent to the hatch of the next elevator. The switch 296 is closed when the transfer frame is extended so as to bring about the energization of the relay H. The switch 297 is operated to energize the relay H whenever the transfer frame is off the elevator. The relay H functions to open the circuit of the elevator so that it cannot be operated when this relay is energized. When the carrier frame 19 is properly positioned on the elevator, the relay H is de-energized and the elevator operator may return the elevator to the loading floor in any usual or well known manner. It will be appreciated from the mechanical description that the elevator operator travels with the carrier frame in its movement to align itself with the storage rack.

The elevator operator is provided with a controller in order that he may properly control the transverse movement of the carrier 19, that is, by moving the contact member 287 into engagement with contact 289 or 292, the elevator operator may bring about the transverse movement of the carrier 19 in one direction or the other, to properly align the tracks 23 of the carrier with the tracks of the storage stall, at a relatively slow speed. The high speed position of the controller is provided so as to reduce the time necessary to properly position the carrier 19. The limit switches 274 and 275 function, in case the elevator operator neglects to properly operate his controller and prevents any damage to the equipment. It will be appreciated, of course, that the elevator operator can immediately stop the transverse movement of the carrier by simply returning the contact making member 287 to its normal position.

It will be obvious that automatic mechanism is preferably employed to bring about the elevator operation and to effect the opening and closing of the doors to the proper stalls at the desired floors. The circuits for controlling the elevator and door operations have not been shown, as any ordinary or usual type may be employed, however, the interlocks between the doors and elevator operating equipment have been illustrated and described.

In order to bring about the operation of the switch control by the doors, it is the usual practice to provide cams in the hatches and project an arm under the elevator when the elevator is running. This is accomplished by the energization of the relay G.

The operation in obtaining a car from storage and delivering it, occurs in substantially the same manner as that hereinbefore described, and it is thought will be obvious.

It will now be assumed that when a car is loaded on the carrier frame 19, it is desired to store it in a storage stall on the opposite side of the building from that which it was received. In order to accomplish this result, the elevator operator, after starting his elevator to the proper floor, will depress the push button 285 and there is a circuit completed through the normally closed contacts P—3, relay P, switch 234, limit switch 235, emergency stop switch 288 and fuse 229 to the other terminal of the source of current. Relay P is energized over this circuit and operates to open its original energizing circuit at the contacts P—3 and establish a locking circuit for itself through contacts P—4. When the relay P operates, there is a circuit completed through the contacts P—5, normally closed contacts U—3, and the relays S and T in multiple, contact member 251 of the switch 241, contact making member 249 to the other side of the line. Relays S and T are energized over this circuit and complete a circuit for the roller arm motor 83, so as to draw the rollers away from the vehicle wheels. The relay T, as well as the relay S, is de-energized when the roller arms are moved back to their normal position by the operation of the switch 241. The operation of the motor 83 then ceases. When the switch 241 is operated, there is a circuit completed by way of the switch through the relay V and the contacts P—6. The relay V establishes a locking circuit for itself at its contacts V—3, and prepares a circuit for the relay U at contacts V—4. Another result of the operation of the relay V is that at the contacts V—2, there is a circuit completed for the relay Q. The relay Q is operated to complete a circuit for the motor 79 so as to drive the transfer truck 76 toward the end of the transfer frame 52, when the transfer truck is properly positioned at the end of the transfer frame limit switch 235 is operated to open the circuit of the relay Q and the relay P. The transfer truck is now in position directly adjacent to the vehicle wheels. This is true because the transfer truck in its forward movement was stopped when the rear wheels of the vehicle were resting in the track depressions, so it is only necessary to drive the transfer truck back to its limit of travel. The operation of the limit switch 235 opens the circuit of the relay Q and also the circuit of the relay P. These relays are de-energized. The de-energization of the relay P serves to complete a circuit for the relay U through the contacts P—7. The relay U is operated to energize the motor 83 and drive the rollers to their proper position on either side of the rear wheels of the vehicle, whereupon the circuit of the relay U is opened as is the circuit of the relay V at the switch 241. The relay V is de-energized. Now when the elevator reaches the desired floor, the elevator operator will move the carrier frame 19 transversely in alignment with the proper stall in the same manner as before described. When the carrier is properly aligned, the elevator operator will then depress the push button 287, thereby completing the circuit for the relay K. A circuit is now completed through the switches 245 and 246 for the relay L and the relay L is energized to complete a circuit through the contacts L—1 and K—3 for the relay N. The relay N is operated to complete a circuit for the motor 41 whereby the transfer frame 52 is shifted into the proper stall. By the operation of the accelerator, the relay R is energized to operate the motor 79 of the transfer truck so that the vehicle is moved along the tracks 23 on the carrier frame into the storage rack. The remaining operations of the equipment occur in identically the same manner as before described. The transfer frame eventually returns, after the vehicle has been stored, to its position on the elevator.

From the foregoing, it is thought that the manner in which a vehicle may be taken and stored in any stall or removed from storage in any stall, accessible to the particular elevator or any floor, will be obvious.

Certain special conditions which may arise will now be considered.

It is possible that the elevator operator may choose a stall in which a car is already placed and may desire to stop the cycle of operation and set up a new cycle under these conditions. In this case, it is only necessary to operate the emergency stop switch 288. It will be seen that the operation of this switch opens up the battery circuit to the control equipment. This will immediately stop and release any cycle of operation that has been set up and a new set of operations can be initiated by the operator in identically the same manner as has been described.

The method by which the elevator operator may properly align the carrier 19 so that the tracks 23 thereon are in alignment with the tracks of the storage stall, has been described. The faulty alignment in the first place may arise from a defective brake or a defective cam setting.

The vehicle handling mechanism of the present invention has been carefully designed with a view of using various standard units and parts in combination to accomplish the desired results. Substantially no new mechanical units have been employed in the combination, though the manner of handling the vehicle and the results accomplished are entirely new. This enables the mechanism to be constructed without any special manufacturing cost. In addition, if anything wears out or gets out of order, it is very easy to obtain spare parts therefor.

It is to be noted also that the vehicle handling mechanism is mounted on the elevator and is common to a large number of stalls. There is no necessity of employing any individual apparatus in the stalls. Another great advantage obtained by the use of my invention, is that all the electrical wiring is inside the elevator hatches. There is no wiring from any storage stall to the elevator. This greatly reduces the cost of installation.

The automobile handling mechanism operates in the manner described, irrespective of variation in the wheel base of the vehicle.

It will be appreciated that the vehicle handling mechanism mounted on one elevator in a building, where there are two elevators, will normally only move to serve half of the storage stalls on any storage floor. However, in case the other elevator goes out of service, the vehicle handling mechanism on the other elevator can take care of all the stalls on the floor, except those adjacent to the first elevator hatchway. The vehicles that might be stored in these stalls can be readily shifted to adjacent stalls, accessible to the vehicle handling mechanism on the other elevator in an obvious manner.

Since the carrier frame moves transversely off the elevator on the storage floor, it may be desirable under certain conditions, though not necessary, to provide an automatic levelling device on the elevator, so as to provide for any slight variations of the elevator level, as the load moves off and on to the elevator.

It will be obvious that while a typical application of my invention has been illustrated, that it may be readily modified to take care of different buildings and to meet different conditions.

My invention is not limited to the particular arrangement of apparatus described, but may be variously changed and modified without departing from the spirit and scope thereof, as indicated in the appended claims.

I claim:

1. In a structure for storing automobiles and like vehicles, the combination of a plurality of storage stalls on every floor facing each other with a pathway between, an elevator, a platform carried by the elevator and movable with respect to it along the pathway on any floor, and a second platform carried by the first and movable in one of two directions with respect to it into any stall on the floor to which the elevator has carried it and mechanism carried by one of said platforms for moving the second platform into any stall.

2. In a structure for storing automobiles and like vehicles, the combination of a plurality of storage stalls on every floor facing each other with a pathway between, an elevator adapted to rise to any floor, of a platform carried by the elevator and movable with respect to it along the pathway on any floor, and a second platform carried by the first and movable in one of two directions with respect to it into any stall on any floor and mechanism carried by one of said platforms for bringing about the movement of the second platform in said two directions.

3. In a structure for storing automobiles and like vehicles, the combination with a plurality of storage floors, a number of storage stalls on each storage floor with a pathway between, a platform, means for placing said platform on the pathway and a vehicle wheel engaging member extensibly held on said platform mechanism on said platform adapted to extend said member into any stall while the platform is maintained in said pathway.

4. In a structure for storing automobiles and like vehicles, the combination with a plurality of floors, a number of storage stalls on each storage floor with a pathway between, a platform, means for placing said platform on the pathway on any floor, mechanism for moving said platform along the pathway and a vehicle wheel engaging member extensibly held on said platform and mechanism on said platform for moving said wheel engaging member into any stall to place a vehicle therein while the platform is maintained in said pathway.

5. In an apparatus for handling automobiles and like vehicles, the combination with a storage structure having a plurality of storage spaces in the same horizontal plane, facing one another with a pathway between, of a platform movable in the pathway, two vehicle wheel engaging members carried by said platform and movable with respect to it mechanism on said platform for moving said members into any one of said stalls, to move a vehicle onto the platform while the platform is maintained in said pathway.

6. In an apparatus for handling automobiles and like vehicles, the combination of an elevator platform, a carrier frame normally associated with said platform and movable onto and off said platform in two directions, a transfer frame mounted on said carrier frame and movable with respect to it, and a vehicle engaging member mounted on said transfer frame and mechanism including an element mounted on said transfer frame for bringing about the movement of said vehicle engaging member.

7. In an apparatus for handling automobiles and like vehicles, the combination of an elevator platform, a carrier frame normally associated with said platform and movable onto and off said platform in two directions, a transfer frame mounted on said carrier frame and movable with respect to it, and a vehicle engaging member mounted on said transfer frame, and movable with respect to the transfer frame and mechanism including an element mounted on said transfer frame for bringing about the movement of said vehicle engaging member.

8. In an apparatus for handling automobiles and like vehicles, an elevator platform, a carrier frame carried by said platform and movable onto and off said platform, vehicle wheel supporting tracks carried by said carrier frame and a vehicle wheel engaging device carried by said carrier frame and movable with respect to it to move a vehicle along said tracks.

9. In an apparatus for handling automobiles and like vehicles, an elevator platform, a carrier frame normally associated with said platform and adapted to move onto and off the platform in two directions, a transfer frame mounted on said carrier frame and movable with respect to it in two directions and a transfer truck mounted on said transfer frame and movable with respect to it.

10. In an apparatus for handling automobiles and like vehicles, the combination of a storage structure provided with a plurality of vehicle storage stalls facing one another, with a pathway between on each floor, of a truck like structure adapted to move along said pathway, a vehicle wheel engaging member carried by said truck like structure and adapted to be projected into any stall to place a vehicle therein, said wheel engaging member being operative to prevent independent movement of the vehicle.

11. In a vehicle storage system, the combination with a vehicle storage structure having a plurality of floors, a plurality of vehicle storage stalls on every floor arranged oppositely and spaced apart to form a pathway between, an elevator hatchway extending from top to bottom of said structure, and an elevator platform adapted to travel in said hatchway, of a vehicle handling device carried on said platform and movable with respect thereto comprising a pair of spaced apart vehicle wheel guiding tracks, a truck mounted between said tracks, mechanism for moving said vehicle handling device from said elevator platform along the pathway into alinement with a stall on any floor, a vehicle engaging member mounted on said truck for movement therewith and with respect thereto, and means for moving said truck with respect to said device to roll a vehicle along said tracks into the alined stall.

12. In a vehicle storage system, the combination with a vehicle storage structure having a plurality of floors, a plurality of vehicle storage stalls on every floor arranged oppositely and spaced apart to form a pathway between, an elevator hatchway extending from top to bottom of said structure, and an elevator platform adapted to travel in said hatchway, of a vehicle handling device carried on said platform and movable with respect thereto comprising a pair of spaced apart vehicle wheel guiding tracks, a truck mounted between said tracks, mechanism for moving said vehicle handling device from said elevator platform along the pathway into alinement with a stall on any floor, a vehicle engaging member mounted on said truck for movement therewith and with respect thereto, and means for moving said truck with respect to said device to roll a vehicle from the alined stall onto and along said tracks.

In witness whereof I hereunto subscribe my name this 8th day of May, 1928.

SAMUEL E. BUETTELL.